US008115754B2

(12) United States Patent
Fu et al.

(10) Patent No.: US 8,115,754 B2
(45) Date of Patent: Feb. 14, 2012

(54) DATA LINE DRIVING METHOD

(75) Inventors: Chung-Lin Fu, Hsin-Chu (TW); Fu-Yuan Liou, Hsin-Chu (TW); Yu-Hsin Ting, Hsin-Chu (TW); Shu-Huan Hsieh, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 534 days.

(21) Appl. No.: 12/413,835

(22) Filed: Mar. 30, 2009

(65) Prior Publication Data

US 2010/0110045 A1 May 6, 2010

(30) Foreign Application Priority Data

Oct. 31, 2008 (TW) ............................... 97142074 A

(51) Int. Cl.
*G06F 3/038* (2006.01)

(52) U.S. Cl. ......................................... 345/204; 345/87

(58) Field of Classification Search ............ 345/87–100, 345/204, 211, 213

See application file for complete search history.

(56) References Cited

U.S. PATENT DOCUMENTS

| | | | | |
|---|---|---|---|---|
| 6,515,647 | B1 | 2/2003 | Sakamoto | |
| 6,731,266 | B1 | 5/2004 | Jung | |
| 7,557,791 | B2 | 7/2009 | Tokumura | |
| 2004/0169631 | A1* | 9/2004 | Tanaka et al. | 345/96 |
| 2007/0063952 | A1* | 3/2007 | Oku et al. | 345/96 |
| 2008/0024418 | A1* | 1/2008 | Kim | 345/98 |
| 2008/0252587 | A1* | 10/2008 | Wang et al. | 345/100 |
| 2010/0053183 | A1* | 3/2010 | Park | 345/536 |
| 2010/0097367 | A1* | 4/2010 | Kitayama et al. | 345/213 |
| 2011/0012940 | A1* | 1/2011 | Lim | 345/690 |
| 2011/0148828 | A1* | 6/2011 | Sampsell et al. | 345/204 |

FOREIGN PATENT DOCUMENTS

JP 2006-030529 2/2006

OTHER PUBLICATIONS

English language translation of abstract and pertinent parts of JP 2006-030529 (published Feb. 2, 2006).

* cited by examiner

*Primary Examiner* — Nitin Patel
(74) *Attorney, Agent, or Firm* — Thomas, Kayden, Horstemeyer & Risley, LLP

(57) ABSTRACT

A data line driving method adapted in a display panel driver circuit is provided. The display panel driver circuit comprises a plurality rows of gate lines and a plurality of data driver stages each corresponding to a data line group, wherein the data line driving method comprises the steps of: turning on the data driver stages in a first sequential order to input a first frame data in the data line groups corresponding to the data driver stages in each gate line activation time within a first frame period; and turning on the data driver stages in a second sequential order which is opposed to the first sequential order to input a second frame data in the data line groups corresponding to the data driver stages in each gate line activation time within a second frame period; wherein the first and the second frame period are two interlaced periods next to each other.

12 Claims, 4 Drawing Sheets

DATA LINE DRIVING METHOD

RELATED APPLICATIONS

This application claims priority to Taiwan Application Serial Number 97142074, filed Oct. 31, 2008, which is herein incorporated by reference.

BACKGROUND

1. Field of Invention

The present invention relates to a data line driving method. More particularly, the present invention relates to a data line driving method adapted in a display panel driver circuit.

2. Description of Related Art

Liquid crystal display becomes the mainstream of the modern display technology and is widely adapted in televisions, computers and portable electronic devices. In order to display the image according to the display data, the driving circuit is used to turn on the pixel array of the liquid crystal display to send the display data into each pixel through the data line.

The conventional data line driving method is to turn on the data driver stages according to arrangement of the stages and send the pixel data to the pixel through the data line in each frame period. However, the parasitical capacitances between the neighboring data lines of each two data driver stages will cause the loss of the data due to coupling effect. The loss of the data further generates incorrect display result on the display panel.

SUMMARY

A data line driving method adapted in a display panel driver circuit is provided. The display panel driver circuit comprises a plurality rows of gate lines and a plurality of data driver stages each corresponding to a data line group, wherein the data line driving method comprises the steps of: turning on the data driver stages in a first sequential order to input a first frame data in the data line groups corresponding to the data driver stages in each gate line activation time within a first frame period; and turning on the data driver stages in a second sequential order which is opposed to the first sequential order to input a second frame data in the data line groups corresponding to the data driver stages in each gate line activation time within a second frame period; wherein the first and the second frame period are two interlaced periods next to each other.

Another object of the present invention is to provide a data line driving method adapted in a display panel driver circuit. The display panel driver circuit comprises a plurality rows of gate lines, a plurality of odd data driver stages and even data driver stages each corresponding to a data line group, the data line driving method comprises the steps of: turning on the odd data driver stages in an sequential order to input a first odd frame data in the data line groups corresponding to the odd data driver stages in each gate line activation time within a first frame period; turning on the even data driver stages in the sequential order to input a first even frame data in the data line groups corresponding to the even data driver stages in each gate line activation time within a first frame period; turning on the even data driver stages in the sequential order to input a second even frame data in the data line groups corresponding to the even data driver stages in each gate line activation time within a second frame period; and turning on the odd data driver stages in the sequential order to input a second odd frame data in the data line groups corresponding to the odd data driver stages in each gate line activation time within a second frame period; wherein the first and the second frame period are two interlaced periods next to each other.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
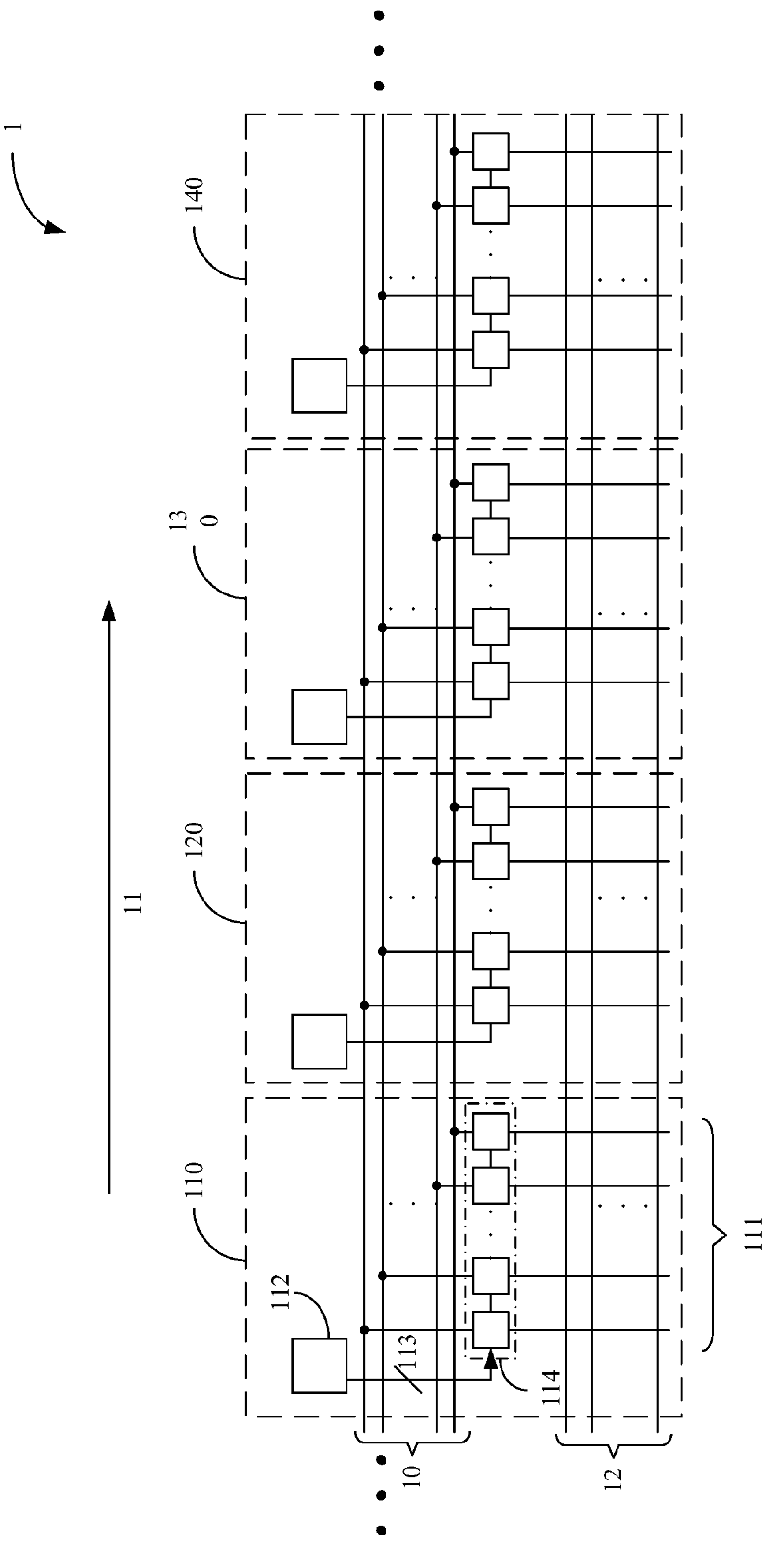
FIG. 1 is a diagram of a display panel driver circuit, wherein the data line driving method of the present invention is adapted in the display panel driver circuit.

Reference will now be made in detail to the present embodiments of the invention, examples of which are illustrated in the accompanying drawings. Wherever possible, the same reference numbers are used in the drawings and the description to refer to the same or like parts.

FIG. 1 is a diagram of a display panel driver circuit 1, wherein the data line driving method of the present invention is adapted in the display panel driver circuit 1. The display panel driver circuit 1 comprises a plurality of data driver stages connected to a plurality of data input lines 10. It's noticed that only four data driver stages 110, 120, 130 and 140 are shown in FIG. 1. The display panel driver circuit 1 further comprises a plurality row of gate lines 12. As depicted in FIG. 1, the data driver stages 110, 120, 130 and 140 are arranged in an sequential order 11 from left to right. Take the data driver stage 110 as example, the data driver stages 110 is corresponding to the data line group 111, and the data line group 111 is connected to a plurality pixels (not shown) on each row of gate lines. The data driver stage 110 comprises a control unit 112 to send a control signal 113 when a gate line is activated. The control signal 113 turns on a switch 114 to turn on the data driver stage 110 and make the display data from the data input line 10 pass to the pixels corresponding to the intersections of the data line group 111 and the activated gate line.

Figure 2A:
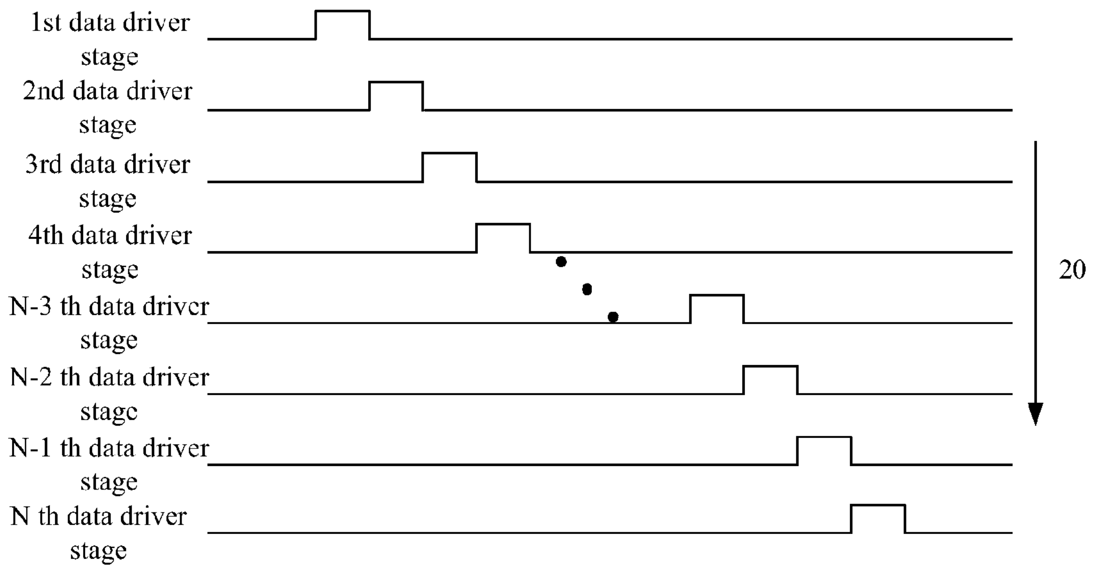
FIG. 2A is a timing diagram of the control signals to turn on the data driver stages in a first sequential order when a row of gate line is activated according to an embodiment of the present invention.
Figure 2B:
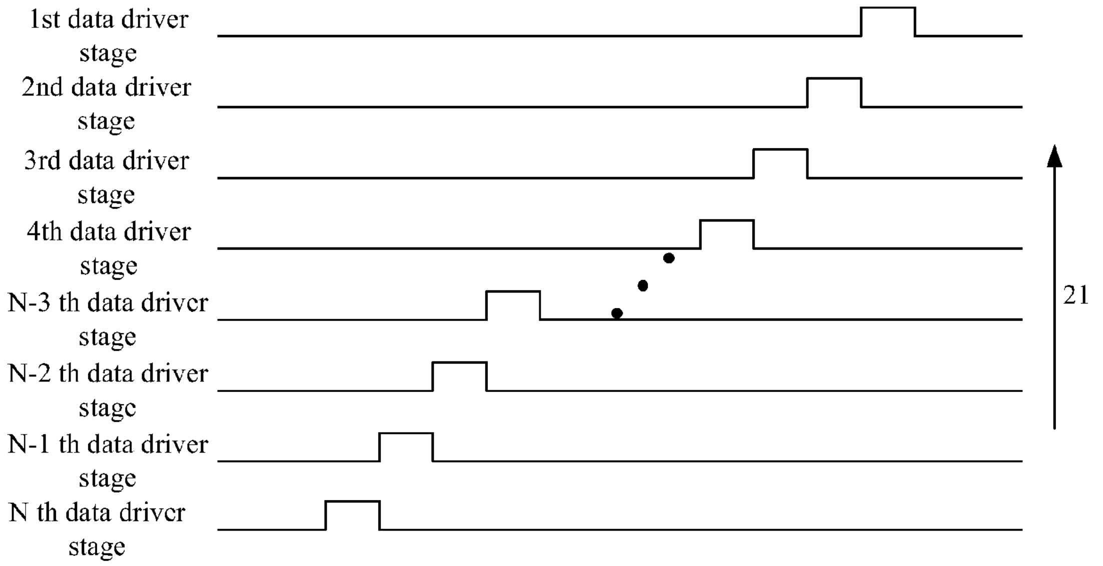
FIG. 2B is a timing diagram of the control signals to turn on the data driver stages in a second sequential order according to an embodiment of the present invention.

Please refer to FIGS. 2A and 2B at the same time. FIGS. 2A and 2B are timing diagrams of the control signal of each data driver stage respectively, which illustrate the data line driving method of the first embodiment of the present invention. It's noticed that, the image, which users observe on the display panel, is a plurality of frames displayed one after another. These frames comprise a plurality of odd frames and a plurality of even frames. The periods when the odd frames are displayed are called odd frame periods and the periods when the even frames are displayed are called even frame periods, wherein the odd and the even frame periods are interlaced. In an embodiment, the gate lines are activated in sequential order in each frame period, wherein in another embodiment, the odd gate lines are activated first, and then the even gate lines are activated as well. When a gate line is activated, the pixels on the gate line receive the display data from the corresponding data lines. FIGS. 2A and 2B are the timing diagrams of the control signal of each data driver stage respectively when a row of gate line is activated. Only the control signals of the first to the third and the N-3 th to the N th data driver stages are depicted in FIGS. 2A and 2B. It's noticed that when the voltage level of the control signal goes high, the control signal turns on the switch of the corresponding data driver stage. When the voltage level goes low, the control signal turns off the switch of the corresponding data driver stage. The first step of the data line driving method of the present invention, as depicted in FIG. 2A, is to turn on the switches of each data driver stages in a first sequential order 20, which is the same as the sequential order 11 of the arrangement of the data driver stages as depicted in FIG. 1 (from the first stage to the N th stage), and to input a first frame data in the data line groups corresponding to the data driver stages in each gate line activation time within the odd frame period, wherein first frame data is the display data of each pixel in the odd frame period. The next step is to turn on the switches of each data driver stages in a second sequential order 21, which is the opposite of the sequential order 20, and to input a second frame data in the data line groups corresponding to the data driver stages in each gate line activation time within the even frame period. Similarly, the second frame data is the display data of each pixel in the even frame period. As described above, the odd frame period and the even frame period are interlaced, thus the above two steps are also executed in an interlaced order.

Figure 3A:
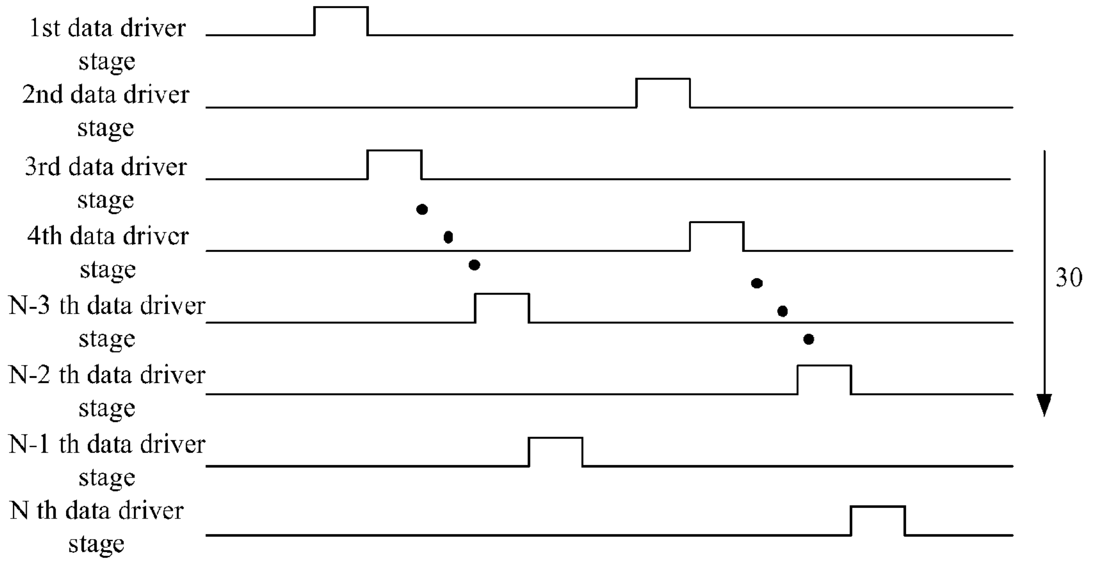
FIG. 3A is a timing diagram of the control signals to turn on the odd data driver stages then the even data driver stages in a first sequential order according to an embodiment of the present invention.
Figure 3B:
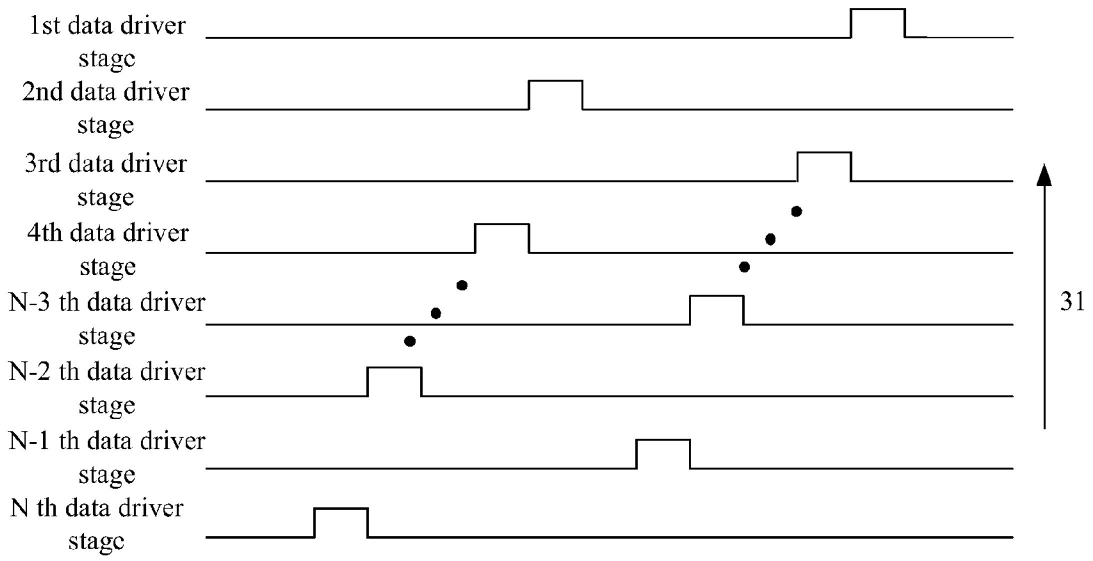
FIG. 3B is a timing diagram of the control signals to turn on the even data driver stages then the odd data driver stages in a second sequential order according to an embodiment of the present invention.

In the second embodiment of the present invention, the data driver stages further comprises a plurality of odd data driver stages and a plurality of even data driver stages. Take the data driver stages 110, 120, 130 and 140 in FIG. 1 as example, the stages 110 and 130 are the odd data driver stages and the stages 120 and 140 are the even data driver stages. The first step of the data line driving method of the second embodiment of the present invention is as depicted in FIG. 3A. The first step is to turn on the switches of each odd data driver stages in a first sequential order 30, which is from the 1st stage, the 3rd stage, the 5th stage . . . to the N-1 th stage, and to input a first frame data in the data line groups corresponding to the odd data driver stages in each gate line activation time within the first frame period. The second step is to turn on the switches of each even data driver stages in the first sequential order 30 from the 2nd stage, the 4th stage, the 6th stage . . . to the N th stage, and to input a first frame data in the data line groups corresponding to the even data driver stages in each gate line activation time within the first frame period. Then in the second frame period, which is depicted in FIG. 3B, the third step is to turn on the switches of each even data driver stages in a second sequential order 31 opposite to the first sequential order 30, which is from the N th stage, N-2 th stage, N-4 stage . . . to the 2nd stage and to input a second frame data in the data line groups corresponding to the even data driver stages in each gate line activation time within the second frame period. The fourth step is to turn on the switches of each odd data driver stages in the second sequential order 31 opposite to the first sequential order 30, which is N-1 th stage, N-3 stage, N-5 stage . . . to the 1st stage, and to input a second frame data in the data line groups corresponding to the odd data driver stages in each gate line activation time within the second frame period. As described above, the first frame period and the second frame period are interlaced, thus the above two steps are also executed in an interlaced order.

Figure 4A:
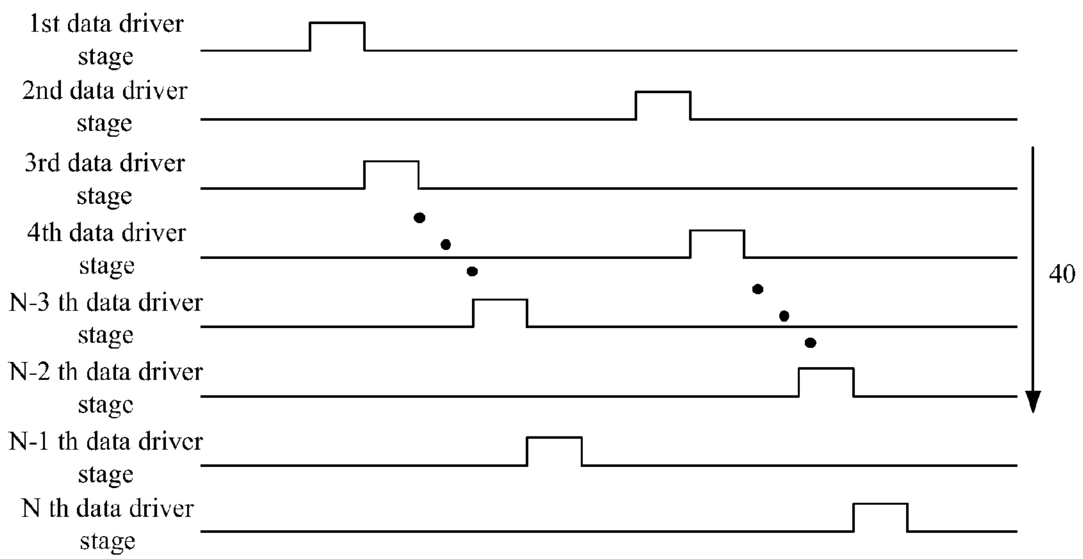
FIG. 4A is a timing diagram of the control signals to turn on the odd data driver stages then the even data driver stages in an sequential order according to an embodiment of the present invention.
Figure 4B:
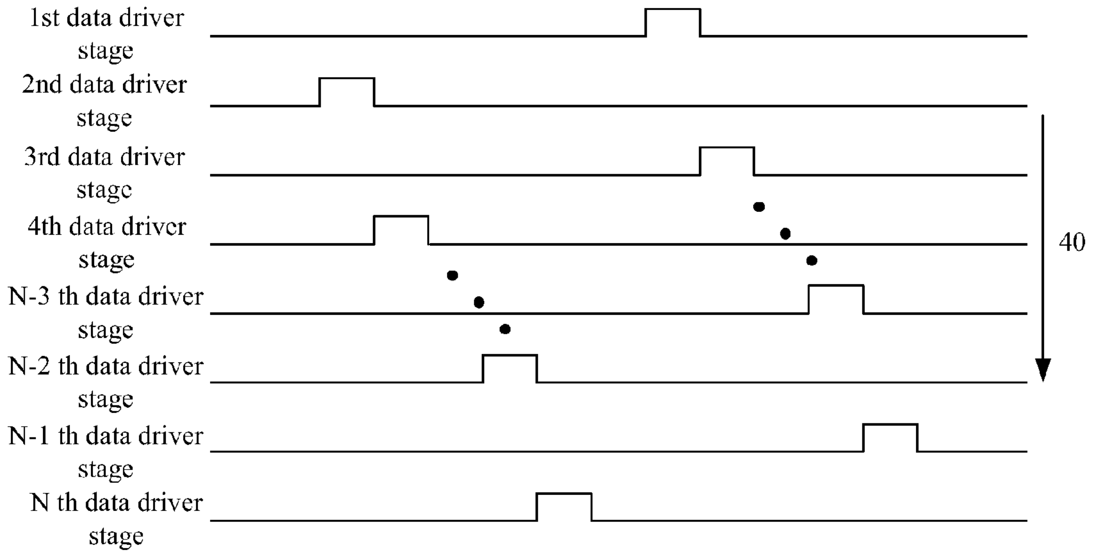
FIG. 4B is a timing diagram of the control signals to turn on the even data driver stages then the odd data driver stages in the sequential order according to an embodiment of the present invention.

The data driver stages in the third embodiment also comprise a plurality of odd data driver stages and a plurality of even data driver stages. The first step of the data line driving method of the third embodiment of the present invention is as depicted in FIG. 4A. The first step is to turn on the switches of each odd data driver stages in a first sequential order 40, which is from the 1st stage, the 3rd stage, the 5th stage . . . to the N-1 th stage, and to input a first frame data in the data line groups corresponding to the odd data driver stages in each gate line activation time within the first frame period. The second step is to turn on the switches of each even data driver stages in the first sequential order 40 from the 2nd stage, the 4th stage, the 6th stage . . . to the N th stage, and to input a first frame data in the data line groups corresponding to the even data driver stages in each gate line activation time within the first frame period. Then in the second frame period, which is depicted in FIG. 4B, the third step is to turn on the switches of each even data driver stages in the same first sequential order 40 and to input a second frame data in the data line groups corresponding to the even data driver stages in each gate line activation time within the second frame period. The fourth step is to turn on the switches of each odd data driver stages in the first sequential order 40 and to input a second frame data in the data line groups corresponding to the odd data driver stages in each gate line activation time within the second frame period. As described above, the first frame period and the second frame period are interlaced, thus the above two steps are also executed in an interlaced order.

In different embodiments, the turn-on process in the odd frame period and the even frame period can switch between each other. Also, the order of the odd and even data driver stages can switch as well.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A data line driving method adapted in a display panel driver circuit, wherein the display panel driver circuit comprises a plurality rows of gate lines and a plurality of data driver stages each corresponding to a data line group, the data line driving method comprises the steps of:

turning on the data driver stages in a first sequential order to input a first frame data in the data line groups corresponding to the data driver stages in each gate line activation time within a first frame period; and turning on the data driver stages in a second sequential order which is opposed to the first sequential order to input a second frame data in the data line groups corresponding to the data driver stages in each gate line activation time within a second frame period;

wherein the first and the second frame period are two interlaced periods next to each other.

2. The data line driving method of claim 1, wherein the first frame period is an odd frame period and the second frame period is an even frame period.

3. The data line driving method of claim 1, wherein the first and the second sequential order are related to an sequential order of the arrangement of the plurality of data driver stages.

4. The data line driving method of claim 1, wherein the steps of turning on the data driver stages are to turn on a plurality of switches corresponding to the data line group of each data driver stages to input the first and the second frame data.

5. The data line driving method of claim 1, wherein the plurality of data driver stages further comprise a plurality of odd data driver stages and a plurality of even data driver stages, the step of turning on the data driver stages in the first sequential order in each gate line activation time within the first frame period further comprises the steps of:

turning on the odd data driver stages in the first sequential order to input the first frame data in the data line groups corresponding to the odd data driver stages in each gate line activation time within the first frame period; and turning on the even data driver stages in the first sequential order to input the first frame data in the data line groups corresponding to the even data driver stages in each gate line activation time within the first frame period.

6. The data line driving method of claim 5, wherein the step of turning on the data driver stages in the second sequential order in each gate line activation time within the second frame period further comprises the steps of:

turning on the even data driver stages in the second sequential order to input the second frame data in the data line groups corresponding to the even data driver stages in each gate line activation time within the second frame period; and turning on the odd data driver stages in the second sequential order to input the second frame data in the data line groups corresponding to the odd data driver stages in each gate line activation time within the second frame period.

7. A data line driving method adapted in a display panel driver circuit, wherein the display panel driver circuit comprises a plurality rows of gate lines, a plurality of odd data driver stages and even data driver stages each corresponding to a data line group, the data line driving method comprises the steps of:

turning on the odd data driver stages in an sequential order to input a first odd frame data in the data line groups corresponding to the odd data driver stages in each gate line activation time within a first frame period;

turning on the even data driver stages in the sequential order to input a first even frame data in the data line groups corresponding to the even data driver stages in each gate line activation time within a first frame period;

turning on the even data driver stages in the sequential order to input a second even frame data in the data line groups corresponding to the even data driver stages in each gate line activation time within a second frame period; and turning on the odd data driver stages in the sequential order to input a second odd frame data in the data line groups corresponding to the odd data driver stages in each gate line activation time within a second frame period;

wherein the first and the second frame period are two interlaced periods next to each other.

8. The data line driving method of claim 7, wherein the first frame period is an odd frame period and the second frame period is an even frame period.

9. The data line driving method of claim 7, wherein the sequential order is related to an sequential order of the arrangement of the plurality of data driver stages.

10. The data line driving method of claim 7, wherein the steps of turning on the odd and the even data driver stages are to turn on a plurality of switches corresponding to the data line group of each data driver stages to input the first and the second odd frame data and the first and the second even frame data.

11. The data line driving method of claim 7, wherein after the step of turning on the odd and the even data driver stages in the sequential order in each gate line activation time within the first frame period further comprises a step of: turning off the plurality of the odd and the even data driver stages in the sequential order.

12. The data line driving method of claim 7, wherein after the step of turning on the odd and even data driver stages in the sequential order in each gate line activation time within the second frame period further comprises a step of: turning off the plurality of the odd and the even data driver stages in the sequential order.

* * * * *